US008902243B2

(12) United States Patent
Tsukagoshi

(10) Patent No.: US 8,902,243 B2
(45) Date of Patent: Dec. 2, 2014

(54) PROJECTOR AND IMAGE DISPLAY METHOD

(75) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 897 days.

(21) Appl. No.: 13/078,307

(22) Filed: Apr. 1, 2011

(65) Prior Publication Data

US 2011/0242124 A1 Oct. 6, 2011

(30) Foreign Application Priority Data

Apr. 2, 2010 (JP) ................................. 2010-085862

(51) Int. Cl.
*G09G 5/00* (2006.01)
(Continued)

(52) U.S. Cl.
CPC ............... *H04N 9/3197* (2013.01); *G09G 5/36* (2013.01); *H04N 9/3182* (2013.01); *H04N 21/4122* (2013.01); *H04N 21/4622* (2013.01); *H04N 21/4854* (2013.01); *H04N 21/6125* (2013.01); *H04N 21/6175* (2013.01); *H04N 21/6547* (2013.01); *H04N 21/84* (2013.01); *G06F 3/14* (2013.01); *G09G 3/002* (2013.01); *G09G 2320/0693* (2013.01); *G09G 2370/04* (2013.01); *H04N 21/4882* (2013.01)
USPC ........... 345/581; 345/619; 345/690; 345/547; 348/563; 348/687; 348/744; 349/7; 382/167; 382/274; 386/219; 386/359; 709/201; 709/219; 715/722; 715/764; 725/40; 725/45; 725/98

(58) Field of Classification Search
USPC ......... 345/581, 589, 617–619, 547–548, 204, 345/690; 348/563, 571, 575, 673, 686–687, 348/739, 744; 349/2, 5, 7; 382/162, 167, 382/254, 274; 386/200, 206, 219, 353, 359, 386/361; 353/28, 30, 39; 709/201, 203, 709/217–219; 715/700, 719–722, 733–738, 715/740, 764, 961; 725/37–40, 44–45, 725/46–48, 54–55, 91, 93, 98, 102–103, 725/114–118
See application file for complete search history.

(56) References Cited

U.S. PATENT DOCUMENTS

2002/0073121 A1* 6/2002 Sano et al. .................... 707/517
2005/0091311 A1* 4/2005 Lund et al. .................... 709/203
(Continued)

FOREIGN PATENT DOCUMENTS

EP 1079605 B 2/2001
JP 2001-60082 A 3/2001
(Continued)

*Primary Examiner* — Wesner Sajous
(74) *Attorney, Agent, or Firm* — ALG Intellectual Property, LLC

(57) ABSTRACT

A projector includes: an image processing section adapted to perform image processing based on image information; a image projection section adapted to project an image based on an image signal output from the image processing section; a communication section adapted to connect to a network; and a control section adapted to transmit usage information including one of an image content of the image information and a projection environment for projecting the image to an information provision server via the communication section and the network, then receive operation setting information, which is prepared by the information provision server in accordance with the usage information, from the information provision server, and then adjust a projection operation, which is performed by the image processing section and the image projection section, based on the operation setting information.

13 Claims, 7 Drawing Sheets

(51) Int. Cl.

| | | |
|---|---|---|
| *G09G 5/02* | (2006.01) | |
| *G09G 5/36* | (2006.01) | |
| *G09G 5/10* | (2006.01) | |
| *H04N 5/445* | (2011.01) | |
| *H04N 5/57* | (2006.01) | |
| *H04N 5/64* | (2006.01) | |
| *G06K 9/00* | (2006.01) | |
| *G06K 9/40* | (2006.01) | |
| *H04N 5/935* | (2006.01) | |
| *G06F 15/16* | (2006.01) | |
| *G06F 3/048* | (2013.01) | |
| *H04N 9/31* | (2006.01) | |
| *H04N 21/41* | (2011.01) | |
| *H04N 21/462* | (2011.01) | |
| *H04N 21/485* | (2011.01) | |
| *H04N 21/61* | (2011.01) | |
| *H04N 21/6547* | (2011.01) | |
| *H04N 21/84* | (2011.01) | |
| *G02F 1/1335* | (2006.01) | |
| *G06F 3/00* | (2006.01) | |
| *G06F 3/14* | (2006.01) | |
| *G09G 3/00* | (2006.01) | |
| *H04N 21/488* | (2011.01) | |

(56) References Cited

U.S. PATENT DOCUMENTS

| | | | |
|---|---|---|---|
| 2007/0124796 A1* | 5/2007 | Wittkotter | 725/136 |
| 2009/0002577 A1 | 1/2009 | Watanabe et al. | |
| 2009/0087016 A1* | 4/2009 | Berestov et al. | 382/100 |
| 2009/0268960 A1 | 10/2009 | Imai et al. | |
| 2009/0310935 A1* | 12/2009 | Era | 386/69 |
| 2010/0053441 A1 | 3/2010 | Tokashiki et al. | |
| 2010/0169410 A1* | 7/2010 | Lund et al. | 709/203 |
| 2010/0220109 A1* | 9/2010 | Aoki et al. | 345/589 |
| 2011/0208822 A1* | 8/2011 | Rathod | 709/206 |

FOREIGN PATENT DOCUMENTS

| | | |
|---|---|---|
| JP | 2004-208022 A | 7/2004 |
| JP | 2008-268623 | 11/2008 |
| JP | 2009-267929 A | 11/2009 |
| JP | 2010-008063 A | 1/2010 |
| JP | 2010-060863 | 3/2010 |
| WO | WO-2006-027866 A | 3/2006 |

* cited by examiner

PROJECTOR AND IMAGE DISPLAY METHOD

CROSS-REFERENCE

The present application claims priority from Japanese Patent Application No. 2010-085862 filed on Apr. 2, 2010, which is hereby incorporated by reference in its entirety.

BACKGROUND

As an image display device, there exists a device which determines the category of the content of the input image, displays display adjustment items expressed as impressions of image quality by the category, receives an input of the setting value with respect to the display adjustment items from the user, and calculates the image parameters corresponding to the setting value received to thereby perform image processing (see Japanese Patent Publication No. 2009-267929).

Further, as another image display device, there exists a device which obtains a color image from a network, and at the same time obtains reproduction characteristics of a color image display device and observation illumination conditions using a camera or the like, and then performs a color conversion on the color image thus obtained based on the reproduction characteristics and the observation illumination conditions (see Japanese Patent Publication No. 2001-60082). On this occasion, the color conversion profile for performing the color conversion can be downloaded via the network.

However, since the image display device of Document 1 calculates the image parameters corresponding to the setting value received from the user by itself and then performs the image processing, it is difficult to perform appropriate image display in accordance with a variety of contents.

Further, since the image display device of Document 2 obtains the reproduction characteristics of the color image display device and the observation illumination conditions and then transmits them to a color reproduction server on the network, it is required to provide the equipment such as a camera to the terminal, which complicates the equipment for setting the conditions to increase the cost.

SUMMARY

Various embodiments may provide a projector and an image display method and an image display device capable of performing appropriate image projection or image display in accordance with a variety of contents and making it possible to eliminate the equipment for setting conditions to thereby reduce the cost.

According to at least one embodiment of the disclosure, there is provided a projector which includes: an image processing section adapted to perform image processing based on image information, a image projection section adapted to project an image based on an image signal output from the image processing section, a communication section adapted to connect to a network, and a control section adapted to transmit usage information including one of an image content of the image information and a projection environment for projecting the image to an information provision server via the communication section and the network, then receive operation setting information, which is prepared by the information provision server in accordance with the usage information, from the information provision server, and then adjust a projection operation, which is performed by the image processing section and the image projection section, based on the operation setting information.

According to the projector described above, since the control section transmits the usage information to the information provision server, and at the same time receives the operation setting information prepared in the information provision server in accordance with the usage information from the information provision server, and then adjusts the projection operation by the image processing section and the image projection section based on the operation setting information, it becomes possible to perform an appropriate image projection in accordance with a variety of image information, and at the same time, appropriate operation setting corresponding to the specifications of the projector and the use conditions becomes possible while omitting the equipment for the condition setting.

According to at least one embodiment of the disclosure, the projector further includes an input section to which operation information is input, and the control section receives inquiry information having a content for making the usage information be input from the information provision server, and then makes the image projection section project the inquiry information as an image, and identifies the usage information based on the inquiry information and the operation information input to the input section. On this occasion, interactive information acquisition between the projector and the information provision server becomes possible, and therefore, the workability of transmission of the usage information can be enhanced.

According to at least one embodiment of the disclosure, the projector further includes an image playback section adapted to retrieve and then output the image information recorded on a recording medium, and the usage information includes information related to a specification of the image playback section. On this occasion, the operation setting information reflecting the standard of the recording medium and so on can be obtained.

According to at least one embodiment of the disclosure, the usage information includes identification information of the recording medium. On this occasion, since the operation setting information is prepared based on the identification information, and is then set to the projector, the operation in the input section can be eliminated.

According to at least one embodiment of the disclosure, the usage information includes one of a category and a title of a video content as the image information. On this occasion, the playback projection of the video material can be made suitable for the content thereof.

According to at least one embodiment of the disclosure, the usage information includes information related to an environment of an installation location of the projector. On this occasion, it is possible to make the projection of the image suitable for the location of the projector and the condition of the illumination.

According to at least one embodiment of the disclosure, the operation setting information includes tint, depth, sharpness, brightness, and contrast. On this occasion, it is possible to make the tint, depth, sharpness, brightness, and contrast suitable for the usage of the projector.

According to at least one embodiment of the disclosure, there is provided an image display method performed by a projector adapted to project an image based on image information including: transmitting usage information, which includes one of an image content of the image information and a projection environment for projecting the image, to an information provision server via a network, receiving operation setting information, which is prepared in the information provision server in accordance with the usage information, from the information provision server, performing image processing based on the image information in accordance with the operation setting information to thereby output an image signal, and projecting an image based on the image signal in accordance with the operation setting information.

According to the image display method described above, since the projector transmits the usage information to the information provision server, and at the same time receives the operation setting information prepared in the information provision server in accordance with the usage information from the information provision server, and then adjusts the projection operation by the image processing section and the image projection section based on the operation setting information, it becomes possible to perform an appropriate image projection in accordance with a variety of image information, and at the same time, appropriate operation setting corresponding to the specifications of the projector and the use conditions becomes possible while omitting the equipment for the condition setting.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF AN EXEMPLARY EMBODIMENT

Hereinafter, a projector according to one embodiment of the invention will be explained in detail with reference to the accompanying drawings.

Figure 1:
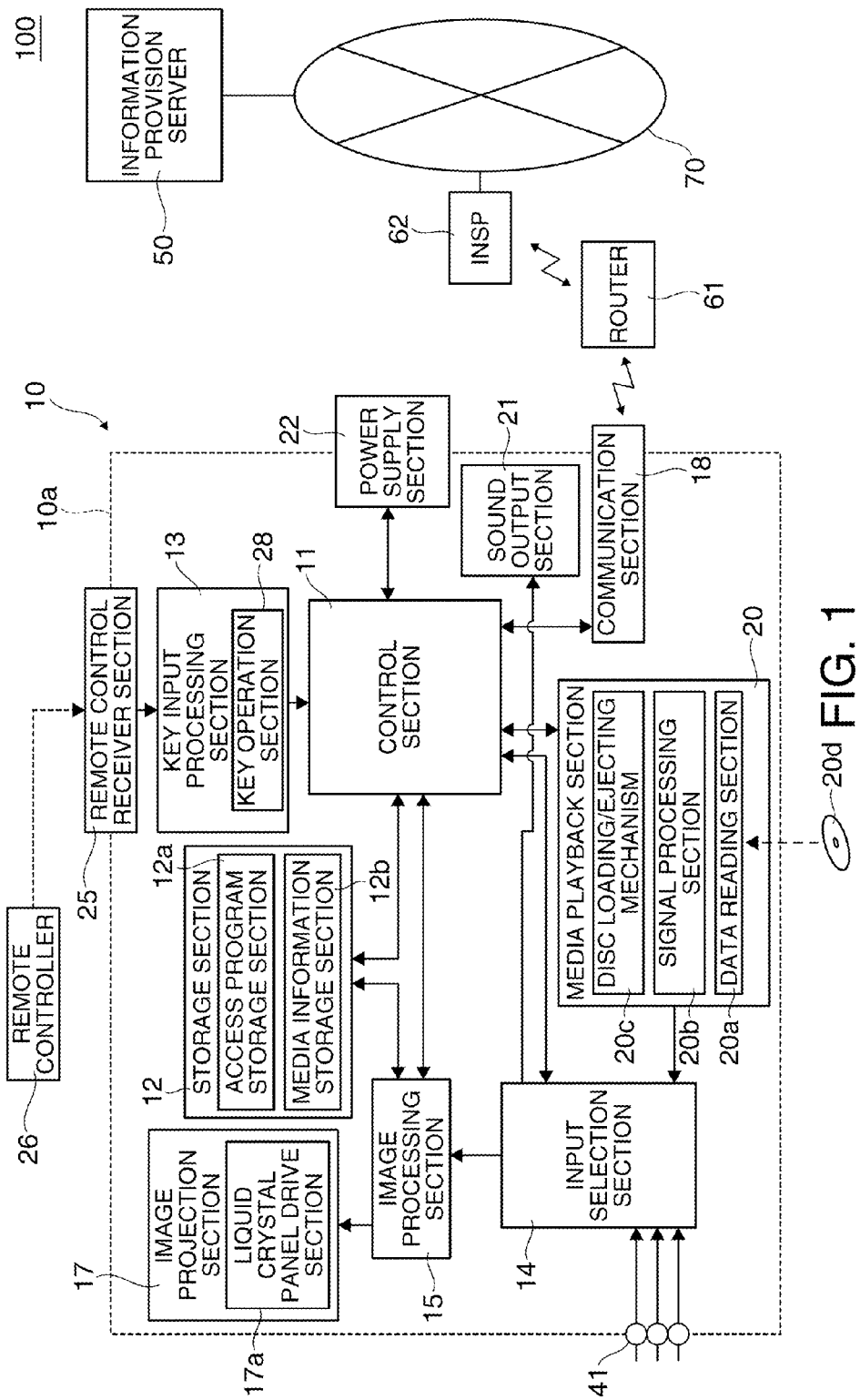
FIG. 1 is a block diagram for explaining an image projection system equipped with a projector according to an embodiment of the invention.

FIG. 1 is a block diagram for explaining an image projection system including a projector according to the embodiment. The image projection system 100 shown in the drawing is provided with a projector 10 and an information provision server 50, and the projector 10 and the information provision server 50 are arranged to be able to communicate with each other via the Internet 70.

The projector 10, as a main body 10a, is provided with a control section 11, a storage section 12, a key input processing section 13, an input selection section 14, an image processing section 15, a image projection section 17, a communication section 18, a media playback section 20, and a power supply section 22.

The control section 11 controls the overall operations of the projector 10. Specifically, the control section 11 is connected to the storage section 12, the key input processing section 13, the input selection section 14, the image processing section 15, the media playback section 20, the power supply section 22, and so on so as to be able to communicate with each other, and obtains the information from and transmits control signals to these components to thereby control the operational states thereof. The control section 11 can adjust the projection operation by the image projection section 17 and the image processing section 15 based on the operation setting information described later.

The storage section 12 holds programs, data, and so on necessary for making the projector 10 operate. In particular, in an access program storage section 12a, the storage section 12 stores the program for communicating with the information provision server 50 to upload usage information and download operation setting information. Further, in a media information storage section 12b, the storage section 12 stores the identification information of a video disc 20d played back in the past and the operation setting information corresponding thereto.

Figure 2:
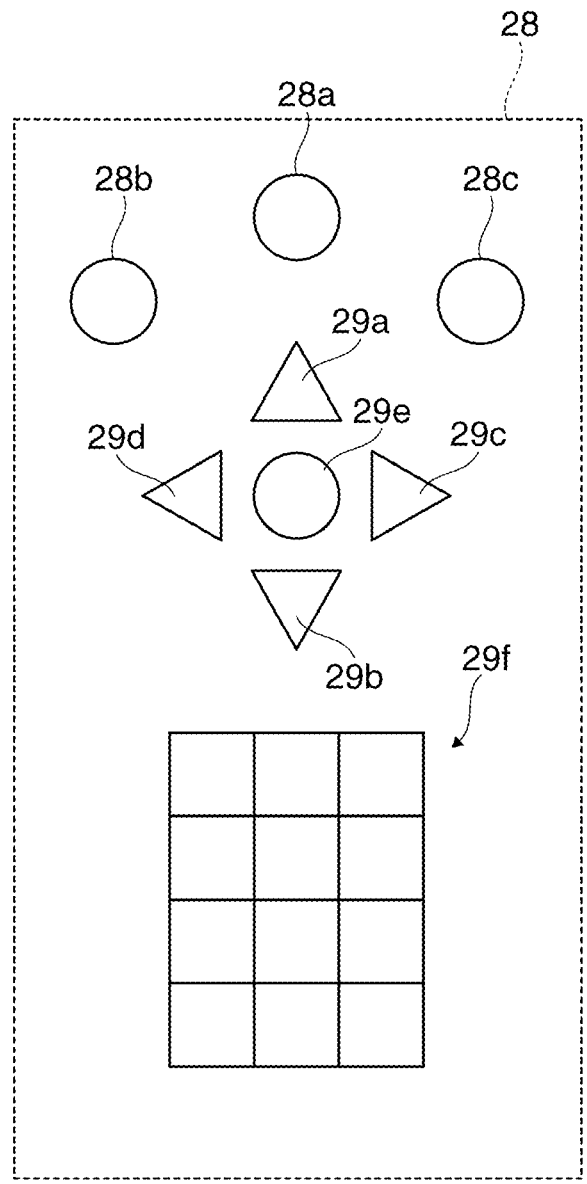
FIG. 2 is a diagram showing an example of key elements constituting a key operation section.

The key input processing section 13 is an input section for inputting an instruction of the user, which has a key operation section 28 including a set of operation keys, and can be associated with a display as a UI. A remote control receiver section 25 is disposed in association with the key input processing section 13 so as to be able to receive the command signal from a remote controller 26 in a wireless and remote manner. It should be noted that as shown in FIG. 2 as an example the key operation section 28 is provided with a power button 28a, a menu button 28b, an escape button 28c, triangular buttons 29a, 29b, 29c, and 29d indicating the four directions, an enter button 29e, twelve symbol input buttons 29f, and so on as a set of operation keys at an appropriate arrangement. These buttons 28a, 28b, 28c, 29a, 29b, 29c, 29d, 29e, and 29f, namely the set of operation keys, can be provided not only to the key operation section 28 but also to the remote controller 26. In such a case, it is also possible to reduce the number of operation keys or the buttons provided to the key operation section 28.

Returning to FIG. 1, the media playback section 20 has a data reading section 20a, a signal processing section 20b, and a disc loading/ejecting mechanism 20c. The media playback section 20 corresponds to an image playback section for reading the information recorded on the video disc 20d as an image recording medium such as a DVD or a BD, and then outputting an image signal based on the information. The data reading section 20a reads the identification information and the picture information recorded on the video disc 20d inserted, and then notifies the control section 11 of the identification information thus read based on the instruction of the control section 11. The picture information read by the data reading section 20a is sequentially output to the signal processing section 20b. The signal processing section 20b performs a process of separating the picture data input from the data reading section 20a into an image signal and a sound signal, a process of decoding the image signal and the sound signal thus separated, and so on based on the instruction of the control section 11. The signal processing section 20b outputs the image signal and the sound signal thus decoded to the input selection section 14 described later. The disc loading/ejecting mechanism 20c retracts the video disc 20d inside the projector 10 and ejects the video disc 20d having been retracted outside the projector 10 based on an instruction of the control section 11.

The input selection section 14 is for selecting which one of a computer not shown or other image output devices (not shown) connected to a connector 41 and the media playback section 20 the image signal is received from, and is arranged to be capable of switching the image signal to be input in accordance with the input operation in the key input processing section 13.

The image processing section 15 can perform various types of corrections including a shift correction, a magnification correction, a distortion correction and so on in addition to adjustment of the image quality such as tint, depth, sharpness, brightness, and contrast on the image signal or the image data read by the media playback section 20 and so on, or on the image signal and so on input from the outside via the input selection section 14 based on an instruction of the control section 11. It should be noted that the image quality adjustment includes adjustment of brightness, contrast, and so on performed for each color. Further, the image processing section 15 can generate an image signal for displaying character information, data information, and so on from the image data taken out from the storage section 12 instead of or superimposed on the image signal input therein based on an instruction of the control section 11.

The image projection section 17 has a liquid crystal panel drive section 17a for driving liquid crystal panels for respective colors of RGB based on the image signal on which the image processing is performed output from the image processing section 15. Although the specific explanation is omitted, the image projection section 17 is provided with, for example, an illumination device, liquid crystal panels for the respective colors, a combining prism, and a projection lens as an optical system, and combines and then projects the light beams transmitted through liquid crystal light valves for the respective colors composed of the liquid crystal panels, thereby displaying a color image on, for example, a screen. In other words, the projector 10 is provided with the media playback section 20 and the image projection section 17, and can therefore function as a projector incorporating a media playback device such as a DVD. It should be noted that the optical system of the image projection section 17 is not limited to the liquid crystal type, but can be a system using various types such as a digital micromirror device type, an LCOS type, a GLV type.

The communication section 18 is an interface circuit for making communications possible. The communication section 18 can be, for example, a wired interface circuit for making wired communications possible or a wireless interface circuit for making wireless communication possible.

It should be noted that the power supply section 22 operates under the control of the control section 11, and supplies each of the sections of the projector 10 with power.

Figure 3:
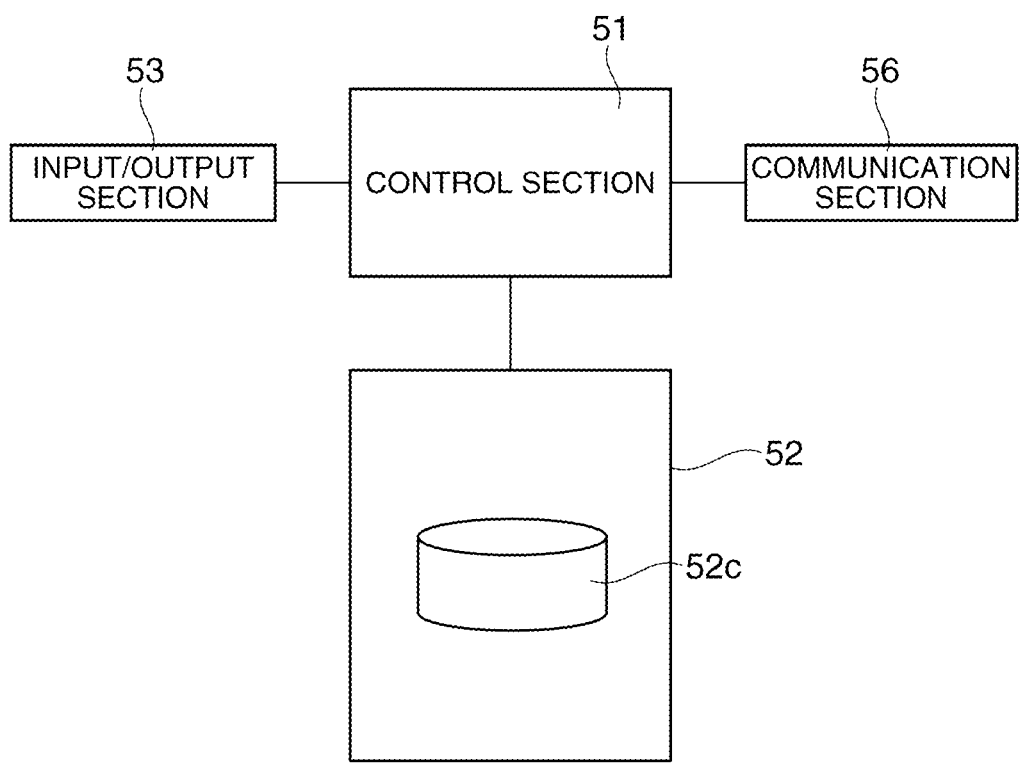
FIG. 3 is a block diagram for explaining an information provision server.

As shown in FIG. 3, the information provision server 50 is provided with a control section 51, a storage section 52, an input/output section 53, and a communication section 56.

The control section 51 controls the overall functions of the information provision server 50. Specifically, the control section 51 is connected to the storage section 52, the input/output section 53, the communication section 56, and so on so as to be able to communicate with each other, and obtains the information from and transmits control signals to these components to thereby control the operational states thereof.

The storage section 52 holds programs, data, and so on necessary for making the information provision server 50 operate. Further, the storage section 52 has a database 52c regarding various media such as the video disc 20d to make it possible to extract the operation setting information (e.g., the setting information regarding the image quality and the picture adjustment) for making the projector 10 appropriately operate out of the setting information stored in the database 52c. The database 52c has content identification information for distinguishing and categorizing the content such as a movie, a television program, or a game delivered with various media such as the video disc 20d, and specifically includes information related to a title, a category, distinction between a domestic movie or a foreign movie, a type of the medium such as a DVD or a BD, the resolution, and so on. Further, the database 52c has the projector information regarding the specifications of the projector 10, and specifically includes the information related to, for example, brightness, resolution, projection magnification, and a type of the operation mode. It should be noted that the database 52c is updated constantly so as to be capable of accepting the latest video disc 20d and the latest projector 10.

The input/output section 53 is operated by the administrator, and is provided with a display, a keyboard, and so on. Further, the communication section 56 is an interface device for connecting to an external communication network such as the Internet 70.

Figure 4:
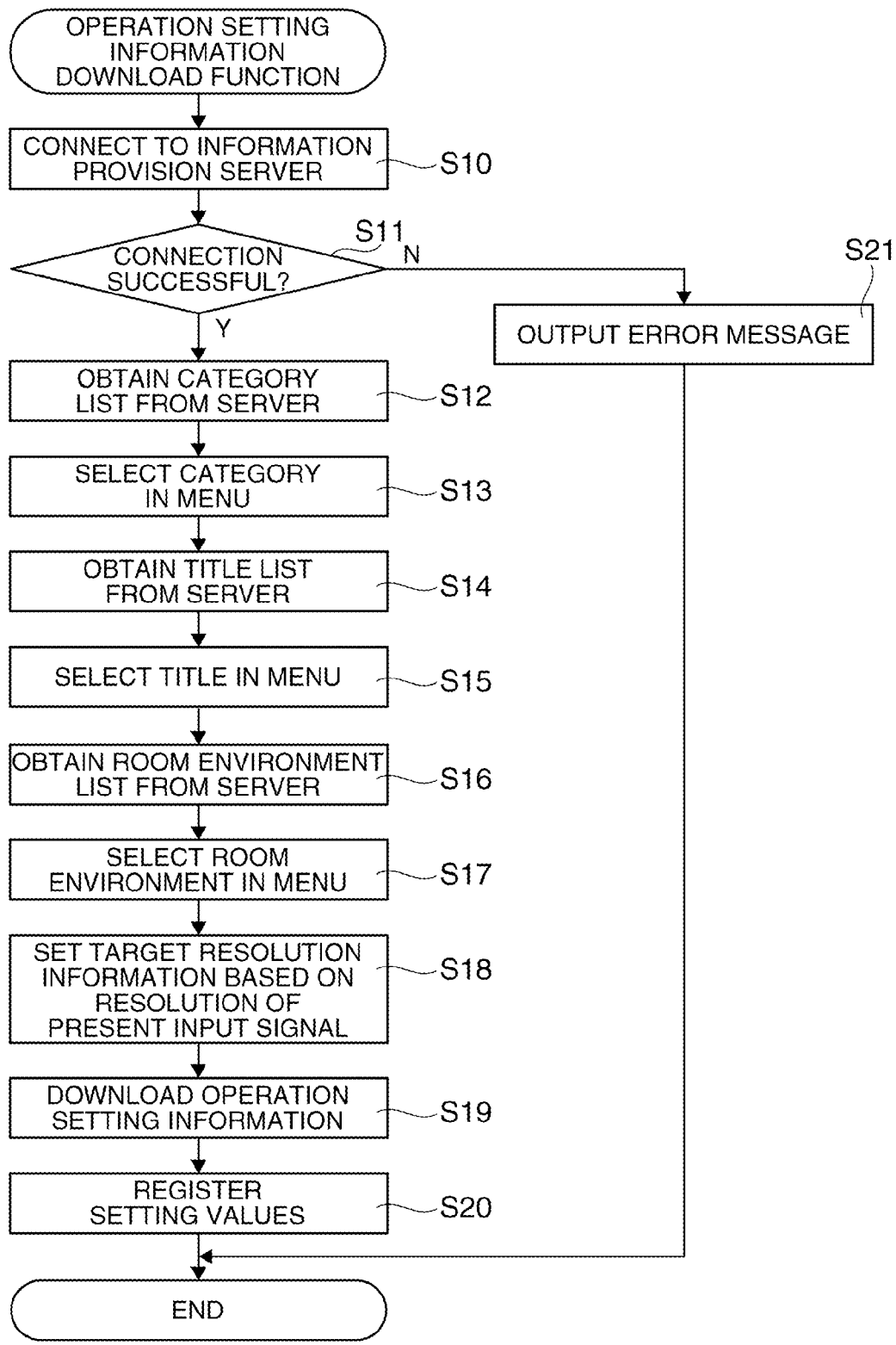
FIG. 4 is a flowchart for explaining an operation of the projector.

Hereinafter, the acquisition operation of the operation setting information of the projector 10 shown in FIG. 1 will be explained with reference to FIG. 4 and so on. It should be noted that such an acquisition operation of the operation setting information can be started when, for example, the user loads the video disc 20d in the media playback section 20 using the disc loading/ejecting mechanism 20c.

Figure 5A:
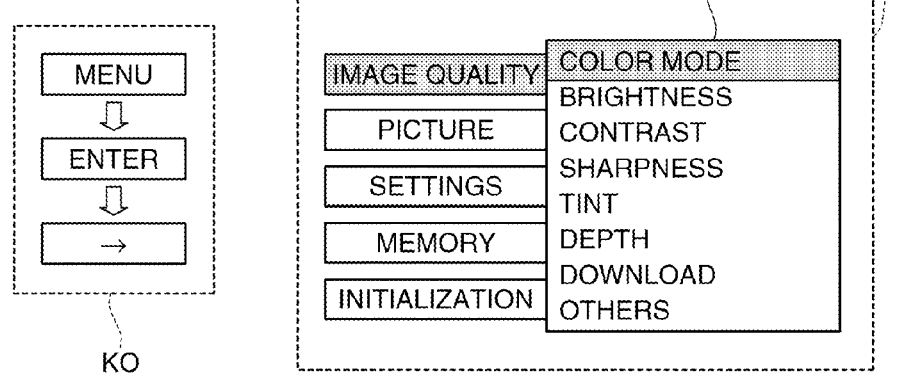
FIGS. 5A through 5C are diagrams for explaining an operation of the projector and a display example.
Figure 5B:
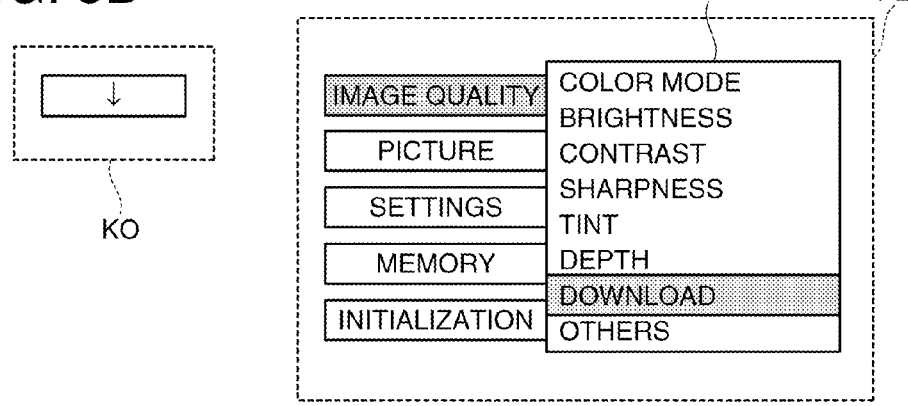
Figure 5C:
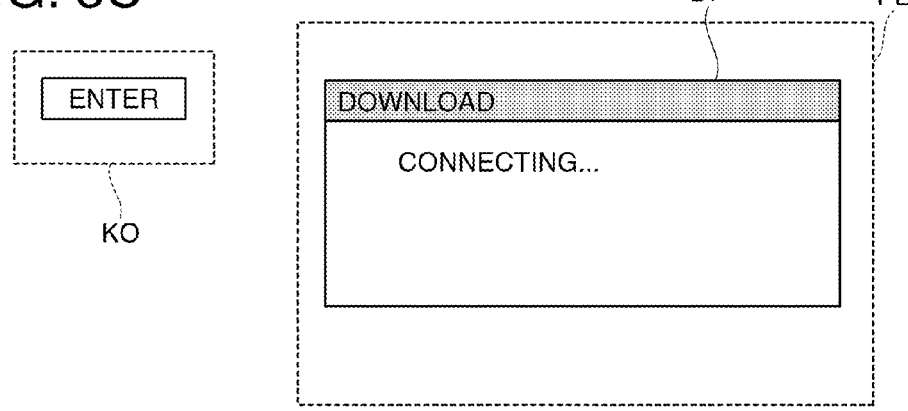

FIGS. 5A through 5C are diagrams for specifically explaining how the acquisition operation of the operation setting information is started. Firstly, as indicated by the specific procedure KO in FIG. 5A, when the user presses the menu (MENU) button 28b of the key operation section 28 provided to the key input processing section 13, and then presses the enter (ENTER) button 29e, setting of the image quality is selected in the display DP in the projection screen PE by the image projection section 17. Then, when the user presses the right-pointing triangular button 29c, the process transfers to display of the color mode setting. Subsequently, as indicated by the specific procedure KO in FIG. 5B, when the user presses the down-pointing triangular button 29b of the key operation section 28 several times, the cursor moves to the indication of download in the display DP in the projection screen PE by the image projection section 17. Further, as indicated by the specific procedure KO in FIG. 5C, when the user presses the enter button 29e of the key operation section 28, the acquisition operation of the operation setting information explained below is started.

When the acquisition operation of the operation setting information starts, the control section 11 of the projector 10 makes the communication section 18 appropriately operate to thereby try (step S10) to connect to the Internet 70, and then further to the information provision server 50 via a router 61 and the provider 62. On this occasion, the control section 11 of the projector 10 uses the image processing section 15 and the image projection section 17, thereby displaying (see FIG. 5C) the display DP including the message meaning that the download is in process, which is arranged to be recognizable to the user, in the projection screen PE.

Subsequently, the control section 11 checks (step S11) whether or not the projector 10 and the information provision server 50 are connected to each other to thereby be capable of communicating with each other. It should be noted that if the connection to the information provision server 50 has failed, the control section 11 makes the error message which can be recognized by the user be projected (step S21) using the image processing section 15 and the image projection section 17, and then terminates the process.

If the projector 10 and the information provision server 50 are connected to each other to thereby be capable of communicating with each other, the control section 11 accesses the information provision server 50 to obtain (step S12) the category list of the video disc 20*d* or the like as inquiry information. Specifically, the control section 11 outputs the command requiring the download of the category list regarding the video contents such as a DVD to the information provision server 50. When receiving the command, the control section 51 of the information provision server 50 retrieves the data regarding the category list from the data base 52*c* stored in the storage section 52, and then transmits it to the projector 10 in an appropriate format.

Figure 6A:
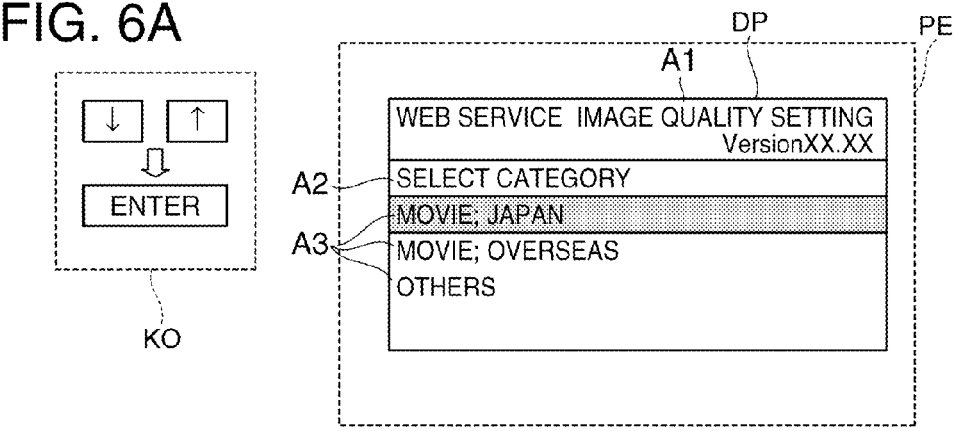
FIGS. 6A through 6C are diagrams for explaining an operation of the projector and a display example.

Subsequently, the control section 11 of the projector 10 projects the category list visually recognizable to the user using the image processing section 15 and the image projection section 17, and at the same time, receives (step S13) the operation (i.e., the operation coping with the inquiry information) of the key input processing section 13 by the user. Thus, the user can select the category of the video disc 20*d* or the like loaded in the media playback section 20 as the image content from the menu screen. Specifically, as shown in FIG. 6A, in the projection screen PE, there is displayed the display DP including the title bar A1 indicating that the image quality setting is in process, the area A2 indicating that the category setting is in process, and the category field A3. As indicated in the specific procedure KO, the user presses the up-pointing triangular button 29*a* or the down-pointing triangular button 29*b* of the key operation section 28 provided to the key input processing section 13, thereby moving the cursor in the display DP so as to shift to the display of the target category. Further, when the user presses the enter button 29*e* of the key operation section 28, the field of Japanese movie is selected.

Subsequently, the control section 11 of the projector 10 accesses the information provision server 50 to obtain (step S14) the title list of the video disc 20*d* or the like as the inquiry information. Specifically, the control section 11 outputs the command requiring the download of the title list regarding the video contents such as a DVD to the information provision server 50. When receiving the command, the control section 51 of the information providing server 50 retrieves the data regarding the title list from the data base 52*c* stored in the storage section 52, and then transmits it to the projector 10 in an appropriate format.

Figure 6B:
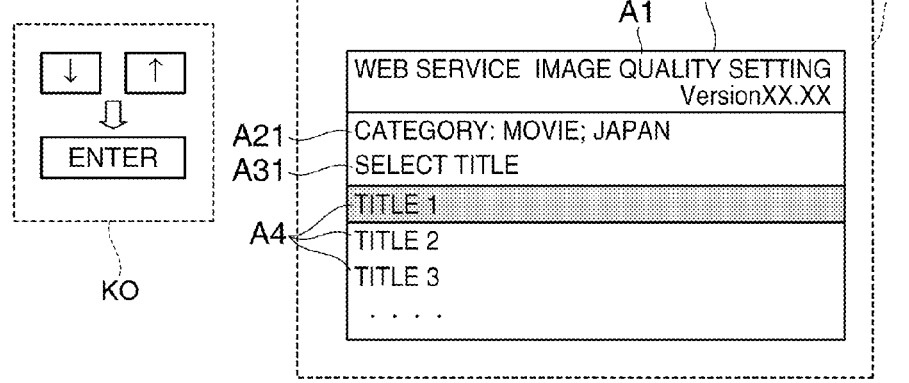

Subsequently, the control section 11 of the projector 10 projects the title list visually recognizable to the user using the image processing section 15 and the image projection section 17, and at the same time, receives (step S15) the operation (i.e., the operation coping with the inquiry information) of the key input processing section 13 by the user. Thus, the user can select the title of the video disc 20*d* or the like loaded in the media playback section 20 as the image content from the menu screen. Specifically, as shown in FIG. 6B, in the projection screen PE, there is displayed the display DP including the area A21 indicating the category setting, the area A31 indicating that the title setting is in process, and the title field A4 in addition to the title bar A1. As indicated in the specific procedure KO, the user presses the up-pointing triangular button 29*a* or the down-pointing triangular button 29*b* of the key operation section 28 provided to the key input processing section 13, thereby moving the cursor in the display DP so as to shift to the display of the target title. Further, when the user presses the enter button 29*e* of the key operation section 28, the first title is selected. It should be noted that regarding the title setting, it is also possible for the user to directly input the title using the symbol input buttons 29*f* of the key operation section 28.

Subsequently, the control section 11 of the projector 10 accesses the information provision server 50 to obtain (step S16) the list related to the environment of the room as the installation location of the projector 10 as the inquiry information. Specifically, the control section 11 outputs the command requiring the download of the list of the environment of the room related to the brightness or the like to the information provision server 50. When receiving the command, the control section 51 of the information provision server 50 retrieves the data regarding the list of the environment setting of the room from the data base 52*c* stored in the storage section 52, and then transmits it to the projector 10 in an appropriate format.

Figure 6C:
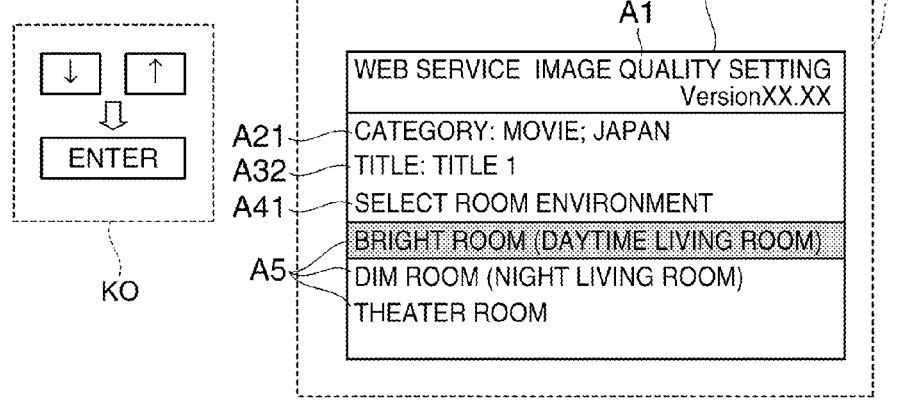

Subsequently, the control section 11 of the projector 10 projects the list of the environment of the room visually recognizable to the user using the image processing section 15 and the image projection section 17, and at the same time, receives (step S17) the operation (i.e., the operation coping with the inquiry information) of the key input processing section 13 by the user. Thus, the user can select the installation environment of the projector 10 from the menu screen as the projection environment. Specifically, as shown in FIG. 6C, in the projection screen PE, there is displayed the display DP including the title bar A1, the area A21 indicating the category setting, the area A32 indicating the title selection, the area A41 indicating that the room environment setting is in process, and the room environment field A5. As indicated in the specific procedure KO, the user presses the up-pointing triangular button 29*a* or the down-pointing triangular button 29*b* of the key operation section 28 provided to the key input processing section 13, thereby moving the cursor in the display DP so as to shift to the display of the target room environment. Further, when the user presses the enter button 29*e* of the key operation section 28, the bright room is selected.

Then, the control section 11 of the projector 10 determines the resolution based on the image signal acquired to the image processing section 15, and then performs (step S18) the resolution setting in the case of projecting the image signal obtained by playing back the video disc 20*d* or the like loaded in the media playback section 20 via the image processing section 15 and the image projection section 17.

Figure 7:
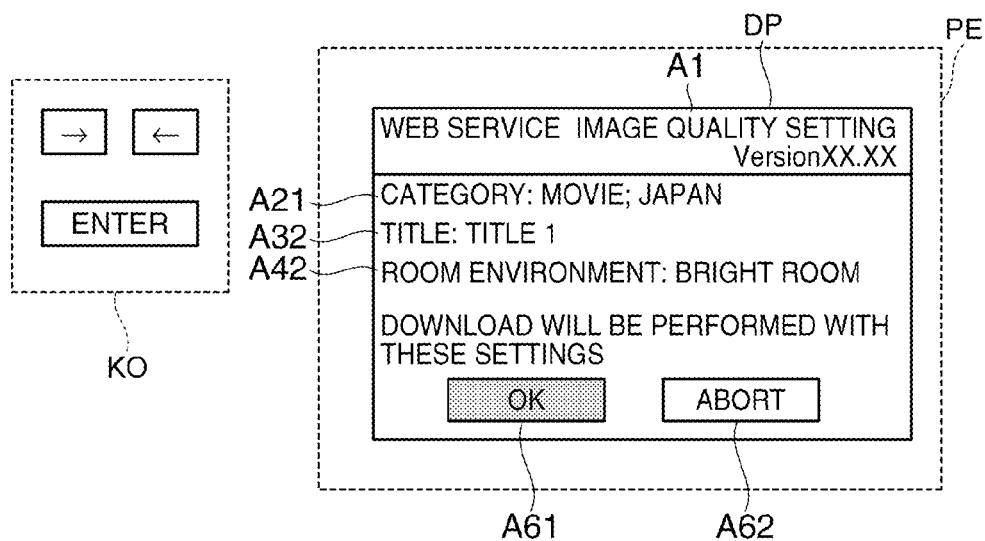
FIG. 7 is a diagram for explaining an operation of the projector and a display example.

Subsequently, the control section 11 of the projector 10 accesses the information provision server 50 to download the operation setting information to be set to the image processing section 15 and so on of the projector 10, and then stores (step S19) it into the storage section 52. FIG. 7 shows an example of the display DP in the projection screen PE by the image projection section 17 at the time point immediately before the download. On this occasion, in the projection screen PE, there is displayed the display DP including the title bar A1, the area A21 indicating the category setting, the area A32 indicating the title selection, the area A42 indicating the room environment setting, an execution button A61, and an abort button A62. As indicated in the specific procedure KO, the user presses the right-pointing triangular button 29*c* or the left-pointing triangular button 29*d* of the key operation section 28 provided to the key input processing section 13, thereby moving the cursor in the display DP to select the execution of the download.

When downloading the operation setting information in the step S19, the control section 11 transmits the usage information such as the category set in the step S13, the title set in the step S15, and the installation environment set in the step S17 to the information provision server 50. Further, in order for receiving the appropriate information from the information provision server 50, the control section 11 transmits the additional information related to the model of the projector 10, the specifications (including such information as whether the video disc 20*d* is a DVD or a BD) of the media playback section 20, the resolution obtained in the step S18, and so on to the information provision server 50 as a sort of usage information. In the information provision server 50, the operation setting information regarded as the optimum is created based on the usage information and the additional information received from the projector 10. On this occasion, the control section 51 of the information provision server 50 determines the operation setting information based on the table stored in the database 52c of the storage section 52 taking the usage information and so on of the projector 10 access from which is in process into consideration. Specifically, as the operation setting information of the projector 10, the items related to the image quality adjustment such as tint, depth, sharpness, brightness, and contrast are determined.

Then, the control section 11 of the projector 10 registers (step S20) the setting value included in the operation setting information received from the information provision server 50 in the step S19. In other words, the operation parameters of the image projection section 17 and the image processing section 15 are appropriately set.

Subsequently, the media playback section 20 of the projector 10 retrieves the picture information recorded on the video disc 20d, and makes the image projection section 17 and the image processing section 15 perform the projection operation. On this occasion, the operational state, specifically the parameters such as tint, depth, sharpness, brightness, and contrast, of the image projection section 17 and the image processing section 15 has been set automatically based on the operation setting information thus downloaded, and therefore, the image viewed can be displayed in the optimum operational state. Thus, the performance of the projector 10 can fully be utilized.

As described above, according to the projector 10 of the present embodiment, since the control section 11 identifies the usage information in accordance with the operation of the key input processing section 13 as the input section, then transmits it to the information provision server 50, and at the same time receives the operation setting information prepared in the information provision server 50 in accordance with the usage information from the information provision server 50, and then adjusts the projection operation by the image processing section 15 and the image projection section 17 based on the operation setting information, it becomes possible to perform an appropriate image projection in accordance with a variety of image information, and at the same time, appropriate operation setting corresponding to the specifications of the projector 10 and the use conditions becomes possible while omitting the equipment for the condition setting.

Hereinabove, although the invention is explained along the embodiments, the invention is not limited to the embodiments described above, but can be put into practice in various forms within the scope or the spirit of the invention, and the following modifications, for example, are also possible.

Although in the embodiment described above the case of the projector having the image projection section is explained, an image display device having an image display section can be adopted.

Further, although in the embodiment described above the case of playing back the video disc 20d by the media playback section 20 is explained, substantially the same process can be performed in the case of downloading video contents from the Internet 70 and then appreciating them. It should be noted that in this case, the acquisition (step S12) of the category list, the selection (step S13) of the category, the acquisition (step S14) of the title list, the selection (step S15) of the title, and so on shown in FIG. 4 are performed in conjunction with the download of the video contents, and are therefore unnecessary for the acquisition operation of the operation setting information.

Further, in the case of playing back another medium after the appreciation of the content by the download from the Internet 70, since the setting corresponding to the download content might be inappropriate in some cases, it is preferable that the setting information is restored to the initial setting information or to the setting information adopted before the appreciation of the download content at an end of the appreciation of the content downloaded.

Further, although in the embodiment described above it is assumed that the category and the title regarding the video content correspond to the usage information related to the image content, and the condition of whether the room is bright or dark corresponds to the usage information related to the projection environment, this assumption is nothing more than an example. For example, it is also possible to transmit the identification information of the video disc 20d retrieved in the data reading section 20a as the usage information, and in this case, the selection of the title or the category by the user shown in FIGS. 6A and 6B can be eliminated. Further, the field of the video content, such as musical, action, and science fiction, can also be used as the usage information. In other words, various conditions and parameters can be set as the usage information.

Further, although in the embodiment described above the usage information related to the projection environment such as whether the room is bright or dark is determined based on the user's operation, this is not a limitation, and it is also possible to adopt the illuminance measured by an illuminance sensor as the usage information related to the projection environment. In this case, the selection by the user shown in FIG. 6C can be eliminated.

Although in the embodiment described above DVDs or BDs are used as the recording media (image recording media), the recording media are not limited thereto, but various types of media such as flash memory devices or SD memory cards can be adopted.

What is claimed is:
1. A projector comprising:
an image processing section adapted to perform image processing based on image information;
an image projection section adapted to project an image based on an image signal output from the image processing section;
a communication section adapted to connect to a network;
an input section to which operation information is input; and
a control section adapted to
receive, from an information provision server via the communication section and the network, inquiry information having content allowing usage information to be input,
project, by the image projection section, the inquiry information as an image,
identify the usage information based on the inquiry information and the operation information input to the input section,
transmit, to the information provision server via the communication section and the network, the usage information including at least one of information related to image content of the image information and information related to a projection environment for projecting the image,
receive operation setting information, which is prepared by the information provision server in accordance with the usage information, from the information provision server, and adjust a projection operation, which is performed by the image processing section and the image projection section, based on the operation setting information.

2. The projector according to claim 1, further comprising:
an image playback section adapted to retrieve image information recorded on a recording medium and output the image information,
wherein the usage information further includes information related to a specification of the image playback section.

3. The projector according to claim 2, wherein
the usage information further includes identification information of the recording medium.

4. The projector according to claim 1, wherein
the information related to the image content includes at least one of a category and a title of a video content.

5. The projector according to claim 1, wherein
the information related to the projection environment for projecting the image includes information related to an environment of an installation location of the projector.

6. The projector according to claim 1, wherein
the operation setting information includes information related to one or more of tint, depth, sharpness, brightness, and contrast.

7. An image display method comprising:
receiving inquiry information having content allowing usage information to be input;
displaying the inquiry information as an image;
receiving operation information;
identifying the usage information based on the inquiry information and the operation information;
transmitting the usage information, which includes at least one of information related to image content of image information and information related to an environment for displaying an image, to an information provision server via a network;
receiving operation setting information, which is prepared in the information provision server in accordance with the usage information, from the information provision server;
performing image processing based on the image information in accordance with the operation setting information to thereby output an image signal; and
displaying an image based on the image signal in accordance with the operation setting information.

8. The image display method according to claim 7,
wherein the usage information further includes information related to a specification of an image playback section which is adapted to retrieve image information recorded on a recording medium and output the image information.

9. The image display method according to claim 8, wherein
the usage information further includes identification information of the recording medium.

10. The image display method according to claim 7, wherein
the information related to the image content includes at least one of a category and a title of a video content.

11. The image display method according to claim 7, wherein
the information related to the environment for displaying the image includes information related to an environment of an installation location.

12. The image display method according to claim 7, wherein
the operation setting information includes information related to one or more of tint, depth, sharpness, brightness, and contrast.

13. An image display device comprising:
an image processing section adapted to perform image processing based on image information;
a communication section adapted to connect to a network;
an input section to which operation information is input; and
a control section adapted to
receive, from an information provision server via the communication section and the network, inquiry information having content allowing usage information to be input,
display the inquiry information,
identify the usage information based on the inquiry information and the operation information input to the input section,
transmit, to the information provision server via the communication section and the network, the usage information including at least one of information related to image content of the image information and information related to environment information for displaying the image,
receive operation setting information, which is prepared by the information provision server in accordance with the usage information, from the information provision server, and
adjust the image processing section, based on the operation setting information.

\* \* \* \* \*